United States Patent [19]

Gago et al.

[11] Patent Number: 4,563,355
[45] Date of Patent: * Jan. 7, 1986

[54] FOOD COMPOSITIONS FOR PIGS AND PROCESSES FOR THE FEEDING OF PIGS

[75] Inventors: Ignace Gago, Braine-l'Alleud; Guillaume Coppens, Brussels, both of Belgium

[73] Assignee: INTEROX (Societe Anonyme), Brussels, Belgium

[ * ] Notice: The portion of the term of this patent subsequent to Aug. 24, 1999 has been disclaimed.

[21] Appl. No.: 391,408

[22] Filed: Jun. 23, 1982

[30] Foreign Application Priority Data

Jul. 2, 1981 [FR] France ................................ 81 13209

[51] Int. Cl.⁴ ............................................... A23K 1/00
[52] U.S. Cl. ........................................ 426/2; 426/623; 426/630; 426/807
[58] Field of Search .................... 426/2, 807, 623, 630, 426/635; 424/130

[56] References Cited

U.S. PATENT DOCUMENTS 4,346,081 8/1982 Gago ................................... 424/130

FOREIGN PATENT DOCUMENTS 0032409 1/1980 European Pat. Off. .
7522040 7/1975 France .
7520228 1/1976 France .
7706664 10/1977 France .
2473270 7/1981 France .

OTHER PUBLICATIONS

Gago et al., "Compositions to be Ingested by Ruminants & use of these Compositions in the Nutrition of Ruminants", Chemical Abst. vol. 95, Abst. No. 131211d (1981).
Nevel et al., "Influence of Calcium Peroxide on Fermentation Pattern & Protozoa in the Rumen", Chemical Abstracts vol. 97 (1982), Abst. No. 126184j.
Haase, Bactericidal Action of Hydrogen Peroxide, Peroxides & Compounds Liberating Oxygen, Chemical Abstracts, vol. 45, (1951), p. 2148e.
Chemical Abstracts, vol. 89, No. 3, Jul. 17th, 1978, p. 538.

*Primary Examiner*—R. B. Penland
*Attorney, Agent, or Firm*—Spencer & Frank

[57] ABSTRACT

The food compositions for pigs contain calcium peroxide. Calcium peroxide is administered to the pigs via the oral route in a proportion of 0.02 to 1.3 % by weight of the total food ration.

The percentage of lean meat and the quality of the carcasses are thus substantially improved.

1 Claim, No Drawings

FOOD COMPOSITIONS FOR PIGS AND PROCESSES FOR THE FEEDING OF PIGS

BACKGROUND OF THE INVENTION

The invention relates to food compositions for pigs. It also relates to a process for the feeding of pigs.

A fundamental problem in the rearing of pigs for meat is to ensure their rapid growth while avoiding excessive fatty deposits. This problem is partially solved by taking care to keep the animals in good health, in vaccinating them and, where necessary, administering bactericidal agents such as antibiotics, and in supplying them with a suitable diet. The latter consists mainly of cereals with suitable additions of proteins and minerals. In this way daily weight increases of 500 to 700 g can be obtained during fattening. However, the mean quality of pig carcasses fed in this way still leaves much to be desired.

SUMMARY OF THE INVENTION

The present invention therefore aims to obtain food compositions for pigs which provide an increase in the percentage of lean meat and an improvement in the quality of the carcasses. These compositions also provide particularly high daily increases in weight during fattening.

The invention therefore relates to food compositions for pigs which contain calcium peroxide.

DETAILED DESCRIPTION OF THE INVENTION

The calcium peroxide present in the compositions according to the invention can be of any known grade. In general a commercial product is used. Commercial products in general contain from 30 to 90% of calcium peroxide, the remainder comprising various compounds such as calcium oxide, hydroxide or carbonate or water and are in the form of particles. Other grades of calcium peroxide can also be suitable.

The calcium peroxide is in general introduced into the food compositions according to the invention in proportions such that the ration of peroxide ingested daily is at least 0.02% and preferably at least 0.05% of peroxide (100%) with respect to the weight of the total food ration. In general these proportions are such that the ration of peroxide ingested daily does not exceed 1.3% and preferably 0.7% of the weight of the total food ration.

The compositions according to the invention can be in the form of a complete food. Thus, they can consist mainly of one or more food substances for pigs such as cereals (barley, maize, oats, wheat, sorghum, soya, rye, millet) and oilseed cakes. The complete food compositions according to the inventon can also contain small quantities of additives usually present in compositions of this type such as inorganic salts, vitamins, trace elements, amino acids, flavourings, binders and antibiotics or other bactericidal agents.

The complete food compositions according to the invention can be in different physical forms for example in the form of compacted tablets, granules, powders or even in semi-liquid form.

The compositions according to the invention can also be in the form of an addition to the normal feed. In this case, they can consist mainly of calcium peroxide or again contain in addition to the calcium peroxide, various other additives such as vitamins, inorganic salts, trace elements, amino acids, flavouring products and binders as well as certain active substances suited to the specific needs of the animal. These additions can be in different physical forms (powders, compacted tablets, or granules and if necessary in liquid or semi-liquid form) and can be given to animals in the form of a ration separate from the feeds. They can also advantageously, be mixed at the moment of use with the food rations. Such compositions of food additives contain in general from 5 to 90% and most often from 10 to 60% by weight of calcium peroxide.

The invention also relates to a process for the feeding of pigs according to which calcium peroxide is administered to them by the oral route. The quantities administered are in general such that the ration ingested daily is from 0.02 to 1.3%, and preferably from 0.05 to 0.7%, of the weight of the total food ration. These quantities can be administered daily over any period and even throughout the life of the animal.

In order to illustrate the invention without, however, restricting its scope, some practical examples of application are given below.

EXAMPLE

Three batches of 15 male pigs castrated two months before, in good health and with a mean weight of around 30 kg were used (batches I to III). They were placed in sties in groups of five animals of comparable weight. The animals were raised under excellent sanitary conditions.

The fattening period was 3 months. Throughout this period the animals received, ad libitum and to the exclusion of any other food, a dry flour for pigs of type 29, sold by INTERAGRI, of 0.95 fodder units and of good bacteriological quality, containing 16.2% of proteins and having an energy content of 9200 kJ/kg and made up with 0.01% to 100% $CaO_2$ (batch I, groups 1 to 3), 0.3% of 100% $CaO_2$ (batch II, groups 4 to 6) and 0.6% of 100% $CaO_2$ (batch III, groups 7 to 9), as well as with calcium carbonate in order to provide a calcium to phosphorus weight ratio of 1.3 in all cases.

The calcium peroxide was used in the form of a product containing 75% of $CaO_2$.

The fattening performance by group of pigs is shown in Table I below. The index of consumption (Ic) represents the total consumption by weight of food in relation to the gain in weight over the full period of the test.

TABLE I

| Batch | Batch I | | | | Batch II | | | | Batch III | | | |
| --- | --- | --- | --- | --- | --- | --- | --- | --- | --- | --- | --- | --- |
| Group | 1 | 2 | 3 | mean | 4 | 5 | 6 | mean | 7 | 8 | 9 | mean |
| $CaO_2$ (100%) content in the food ration % | | 0,01 | | | | 0,3 | | | | 0,6 | | |
| Initial weight, kg | 24,8 | 27,9 | 30,3 | 27,7 | 25,1 | 28,0 | 30,3 | 27,8 | 24,8 | 28,1 | 30,5 | 27,8 |
| Final weight, kg | 93,1 | 91,4 | 94,3 | 92,9 | 95,5 | 94,6 | 93,4 | 94,5 | 89,8 | 95,3 | 92,1 | 92,4 |
| Growth, g/day | 740 | 706 | 717 | 721 | 745 | 732 | 693 | 723 | 654 | 706 | 733 | 698 |

TABLE I-continued

| Batch | Batch I | | | | Batch II | | | | Batch III | | | |
|---|---|---|---|---|---|---|---|---|---|---|---|---|
| Group | 1 | 2 | 3 | mean | 4 | 5 | 6 | mean | 7 | 8 | 9 | mean |
| Consumption, kg/day | 2,65 | 2,55 | 2,69 | 2,63 | 2,57 | 2,70 | 2,78 | 2,68 | 2,40 | 2,61 | 2,93 | 2,65 |
| Ic | 3,58 | 3,61 | 3,75 | 3,65 | 3,45 | 3,69 | 4,01 | 3,72 | 3,68 | 3,69 | 3,99 | 3,79 |
| Fattening time, days | 92,2 | 90,0 | 89,3 | 90,5 | 94,5 | 91,0 | 91,0 | 92,2 | 99,4 | 95,2 | 84,0 | 92,9 |

After around three months, 41 animals were slaughtered including 13 from batch I and 14 from each of batches II and III. The carcasses were classified according to the EEC standard according to which the letters below have the following meanings:

AA: very good meat pig
A: meat pig
B: average meat pig
I: pork pig
II: semi-bacon pig
III: bacon pig.

The distribution of the pigs by category in each batch and the mean price obtained on sale per batch are given in Table II.

TABLE II

| Category | | No. of carcasses | | |
|---|---|---|---|---|
| EEC Classification | Price per kg in Belgian francs | Batch I | Batch II | Batch III |
| AA | 65,0 | — | — | 3 |
| IA | 60,0 | 4 | 7 | 3 |
| IB | 56,5 | 5 | 3 | 4 |
| IIA | 56,0 | 3 | 3 | 3 |
| IIB | 50,5 | 1 | 1 | 1 |
| Average price of batch Belgian francs per kg | | 57,0 | 57,71 | 58,53 |

I claim:

1. A process for feedings pigs consisting essentially of feeding to pigs a pig feed ration together with calcium peroxide in an amount of 0.3 to 0.7% of the weight based on the total feed ration whereby the quality of pig carcasses are substantially improved.

* * * * *